(12) United States Patent
Billman et al.

(10) Patent No.: US 12,453,796 B1
(45) Date of Patent: Oct. 28, 2025

(54) TARGETED BUILDING SANITATION

(71) Applicant: UIPCO, LLC, San Antonio, TX (US)

(72) Inventors: Bradly Jay Billman, Celina, TX (US); Brian Tougas, Spring Branch, TX (US); Arthur Quentin Smith, Fredericksburg, TX (US); Mark P. Warnick, San Antonio, TX (US); Oscar Roberto Tijerina, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 439 days.

(21) Appl. No.: 17/866,220

(22) Filed: Jul. 15, 2022

Related U.S. Application Data

(60) Provisional application No. 63/222,320, filed on Jul. 15, 2021.

(51) Int. Cl.
| | |
|---|---|
| *A61L 2/24* | (2006.01) |
| *A61L 2/10* | (2006.01) |
| *A61L 2/20* | (2006.01) |
| *G05B 15/02* | (2006.01) |

(52) U.S. Cl.
CPC .............. *A61L 2/24* (2013.01); *A61L 2/10* (2013.01); *A61L 2/202* (2013.01); *G05B 15/02* (2013.01); *A61L 2202/14* (2013.01); *A61L 2202/15* (2013.01); *A61L 2202/16* (2013.01); *A61L 2202/17* (2013.01); *A61L 2202/25* (2013.01)

(58) Field of Classification Search
CPC ... A61L 2/24; A61L 2/10; A61L 2/202; A61L 2202/14; A61L 2202/15; A61L 2202/16; A61L 2202/17; A61L 2202/25; G05B 15/02
See application file for complete search history.

(56) References Cited

U.S. PATENT DOCUMENTS

| | | | | |
|---|---|---|---|---|
| 2014/0022073 | A1* | 1/2014 | Balinski | G16H 40/20 340/539.13 |
| 2014/0031989 | A1* | 1/2014 | Bergman | F24F 11/66 700/276 |
| 2014/0167917 | A2* | 6/2014 | Wallace | G16H 40/67 340/10.1 |
| 2020/0009280 | A1* | 1/2020 | Kupa | A61L 2/10 |
| 2021/0393834 | A1* | 12/2021 | Wellig | F24F 11/63 |

* cited by examiner

*Primary Examiner* — Kamini S Shah
*Assistant Examiner* — Mohammed Shafayet
(74) *Attorney, Agent, or Firm* — Perkins Coie LLP

(57) ABSTRACT

Systems and methods for automatically performing a cleaning operation for a portion of a building are described herein. In one example, cleaning data specifying human activity in the portion of the building and/or one or more current infection rates for one or more pathogens can be received from one or more data sources. Based on the cleaning data, a probability of the one or more pathogens being present in the portion of the building can be determined. One or more cleaning operations for the portion of the building can be determined based on the received cleaning data, a determined probability of the one or more pathogens being present, and a risk tolerance condition. In response to detecting a trigger for at least one cleaning operation, a command can be generated to perform the at least one cleaning operation, and the command can be transmitted to a cleaning device.

20 Claims, 9 Drawing Sheets

TARGETED BUILDING SANITATION

CROSS-REFERENCE TO RELATED APPLICATION

This application is a non-provisional of and claims priority to U.S. Provisional Application No. 63/222,320, filed on Jul. 15, 2021, entitled "TARGETED BUILDING SANITATION," which is hereby incorporated by reference in its entirety for all purposes.

TECHNICAL FIELD

The present disclosure is directed to an automatic building sanitation system.

BACKGROUND

Dangers from hazards such as viruses, bacteria, and other pathogens are more prevalent than ever, which means building sanitation can greatly impact the health and wellbeing of the building's occupants. Keeping areas of buildings sanitary promotes the health of those who use the building by keeping the building free of such hazards. For example, the COVID-19 pandemic has infected millions of people and prevented interactions while people are stuck in their homes. Current sanitation practices are poorly equipped to effectively sanitize buildings in a manner that keeps people safe and permits greater social interactions. These sanitation practices typically involve one or more people manually sanitizing areas of a building, such as disinfecting door handles with sanitizing products, disinfecting public use areas (e.g., restrooms, dining areas, and the like), providing sanitizing products to occupants of the building, and other activities. Building sanitation is typically performed on a regular schedule, such as daily, or in response to certain occurrences such as a spill, by notifying the sanitation personnel. However, such procedures fail to sanitize in a manner that accounts for likely pathogen transfers and fails to keep occupants safe between uses of building areas.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
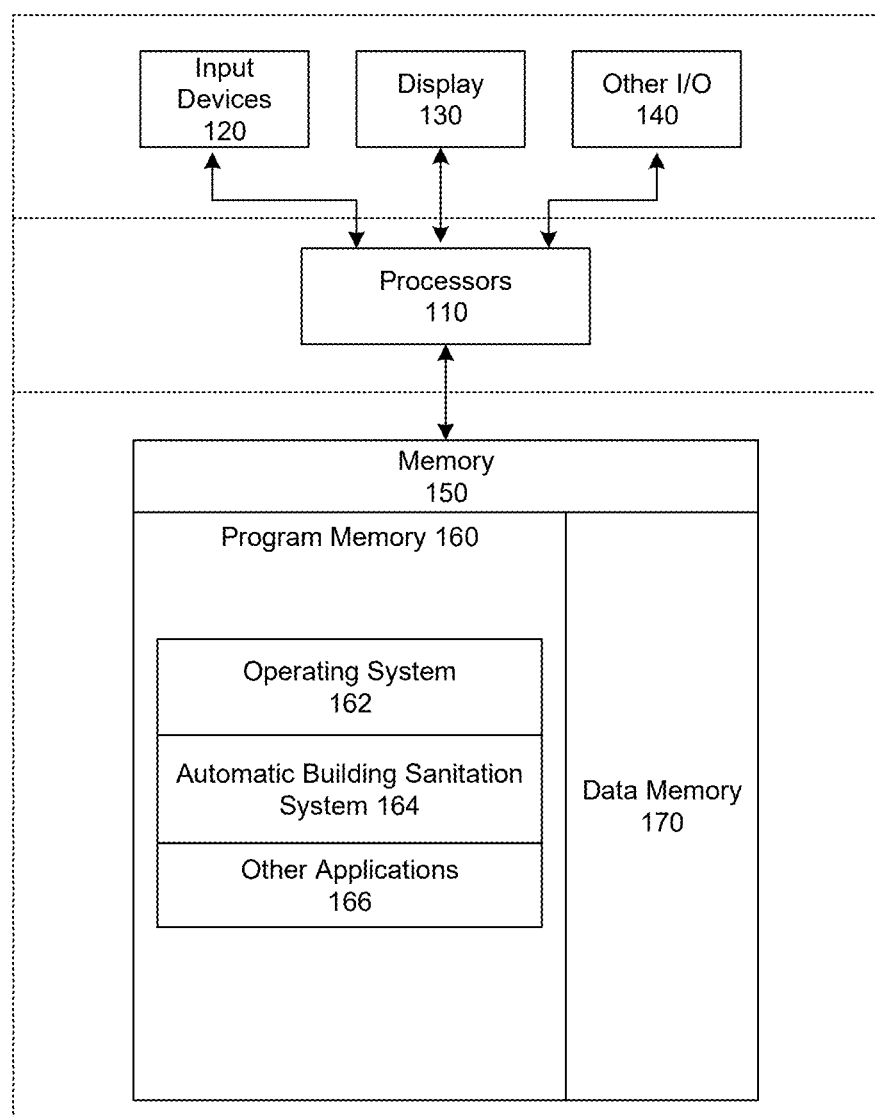
FIG. 1 is a block diagram illustrating an overview of devices on which some implementations can operate.

Aspects of the present disclosure are directed to an automatic building sanitation system. The automatic building sanitation system can gather data for use in determining which portions of a building need to be sanitized and a manner in which the portions of the buildings should be sanitized. Data can be gathered using publicly available health data, occupancy data for portions of the building (such as data gathered from door sensors, cameras, and the like), user input data, user device data, and other data sources. Based on the gathered data, the automatic building sanitation system can determine one or more cleaning operations for the portions of the building, such as cleaning a personal workspace of an occupant of the building while the occupant is not in the workspace. Commands for executing the cleaning operations are then sent to one or more cleaning devices, such as ultraviolet ("UV") lights, stationary chemical disinfecting systems (such as a device configured to spray a disinfectant on a door handle), systems that use ventilation systems, or mobile cleaning devices such as drones.

In one example, the automatic building sanitation system receives cleaning data from one or more data sources and determines one or more cleaning operations based on the received data. The cleaning operations can include one or more triggers for initiating that cleaning operation. For example, when a person who is not an occupant of the building enters the building, the automatic building sanitation system can determine that an entryway needs to be sanitized with disinfectant. When the person enters the building (i.e., when the trigger is detected), the automatic building sanitation system generates commands for one or more cleaning devices to execute the cleaning operation at the entryway and then transmits the commands to the cleaning devices. Additional details regarding performing cleaning operations can be found below in relation to FIG. 4.

In another example, the automatic building sanitation system receives data from one or more sensors and/or one or more user inputs. The sensors can be cameras, occupancy sensors, door sensors, and the like. The data is used by the automatic building sanitation system to identify which portions of the building require sanitation and what type of sanitation is needed. Based on these determinations, the automatic building sanitation system determines one or more cleaning operations for the identified portions of the building and stores the cleaning operations in memory for later use. Additional details regarding generating cleaning operations can be found below in relation to FIG. 5.

In yet another example, the automatic building sanitation system determines a schedule for sanitizing portions of the building. The automatic building sanitation system receives cleaning data from one or more sensors or other inputs and also receives one or more schedules associated with the portions of the building. Based on the cleaning data and the schedules, the automatic building sanitation system determines a schedule for the stored one or more cleaning operations. At the scheduled time for sanitation, the automatic building sanitation system generates and transmits commands to cleaning devices to execute the cleaning operations. Additional details regarding scheduling cleaning operations can be found below in relation to FIG. 6.

In a further example, the automatic building sanitation system receives a user-defined trigger event for one or more cleaning operations. The trigger event is an event that occurs in the building that is detectable, such as a sensor detecting a person occupying a portion of the building or a person's personal computing device connecting to a wireless network within a portion of the building. After the trigger event is detected, the automatic building sanitation system generates and transmits commands to cleaning devices to execute the cleaning operations. Additional details regarding trigger-based execution of cleaning operations can be found below in relation to FIG. 7.

In another example, a cleaning device receives the command from the automatic building sanitation system to execute a cleaning operation. The cleaning device can be a stationary cleaning device, such as a UV light or disinfecting system directed at a particular part of a building (e.g., a door handle, an area of a room, a tabletop, etc.), or can be a mobile cleaning device, such as a drone with a disinfecting product attached and controllable by the drone. In some implementations, prior to executing the cleaning operation, the cleaning device can ensure people are not present. The cleaning device then executes the cleaning operation. Additional details regarding a cleaning device performing a cleaning operation can be found below in relation to FIG. 8.

Maintaining sanitation of the building requires a large amount of people-hours, and keeping the building sanitary in response to events within the building can require even more effort on the part of maintenance staff, security staff, and others in charge of keeping the building sanitary. Tracking occupancy of portions of the building can require hours of reviewing security camera footage or manually walking around the building to identify what portions of the building have been used. Maintenance staff must then spend hours performing the sanitation tasks throughout the building.

Using the automatic building sanitation system, occupancy and usage of portions of the building can be determined near-instantaneously and either immediately acted upon or scheduled for future sanitation action using automated cleaning devices. This saves countless hours of maintenance staff time and allows staff to focus on tasks that cannot be performed by automated cleaning devices. Sanitation activities can be scheduled for when the minimal amount of people will be in the building or can be performed immediately upon detection of a triggering event, such as an unknown individual entering the building, instead of waiting for a pre-scheduled time long after the triggering event has occurred. Doing so can minimize the amount of risk to occupants, based on risk tolerance or acceptance levels, both by keeping disinfecting chemicals and other sanitation activities away from occupants and by reacting to triggering events immediately, minimizing the potential spread of any bacteria or viruses.

Several implementations are discussed below in more detail in reference to the figures. FIG. 1 is a block diagram illustrating an overview of devices on which some implementations of the disclosed technology can operate. The devices can comprise hardware components of a device 100 for controlling building sanitation. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, automatic building sanitation system 164, and other application programs 166. Memory 150 can also include data memory 170, e.g., data used to control building sanitation, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, drones, stationary disinfecting systems, distributed computing environments that include any of the above systems or devices, or the like.

Figure 2:
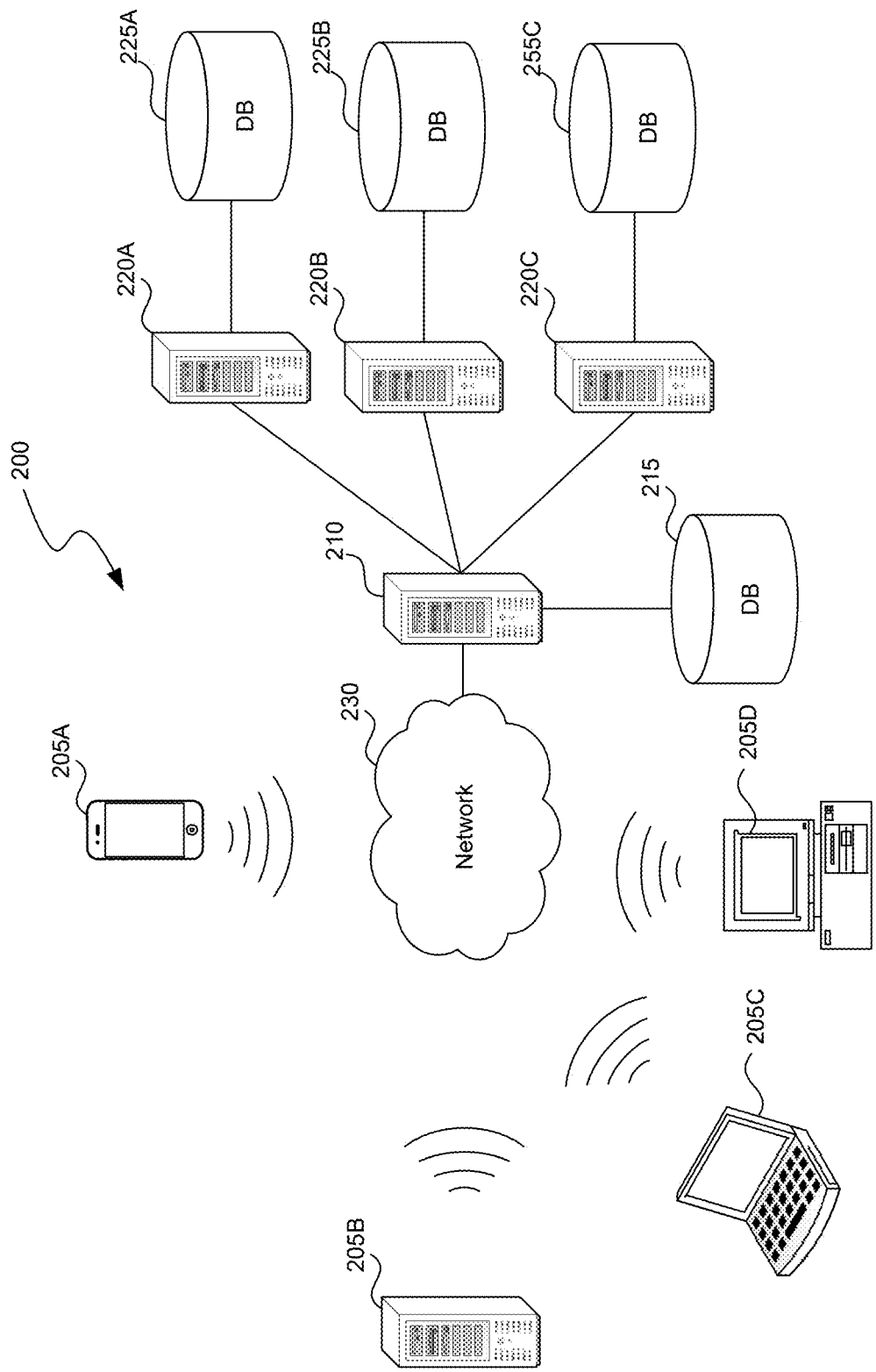
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as cleaning and sanitation data. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
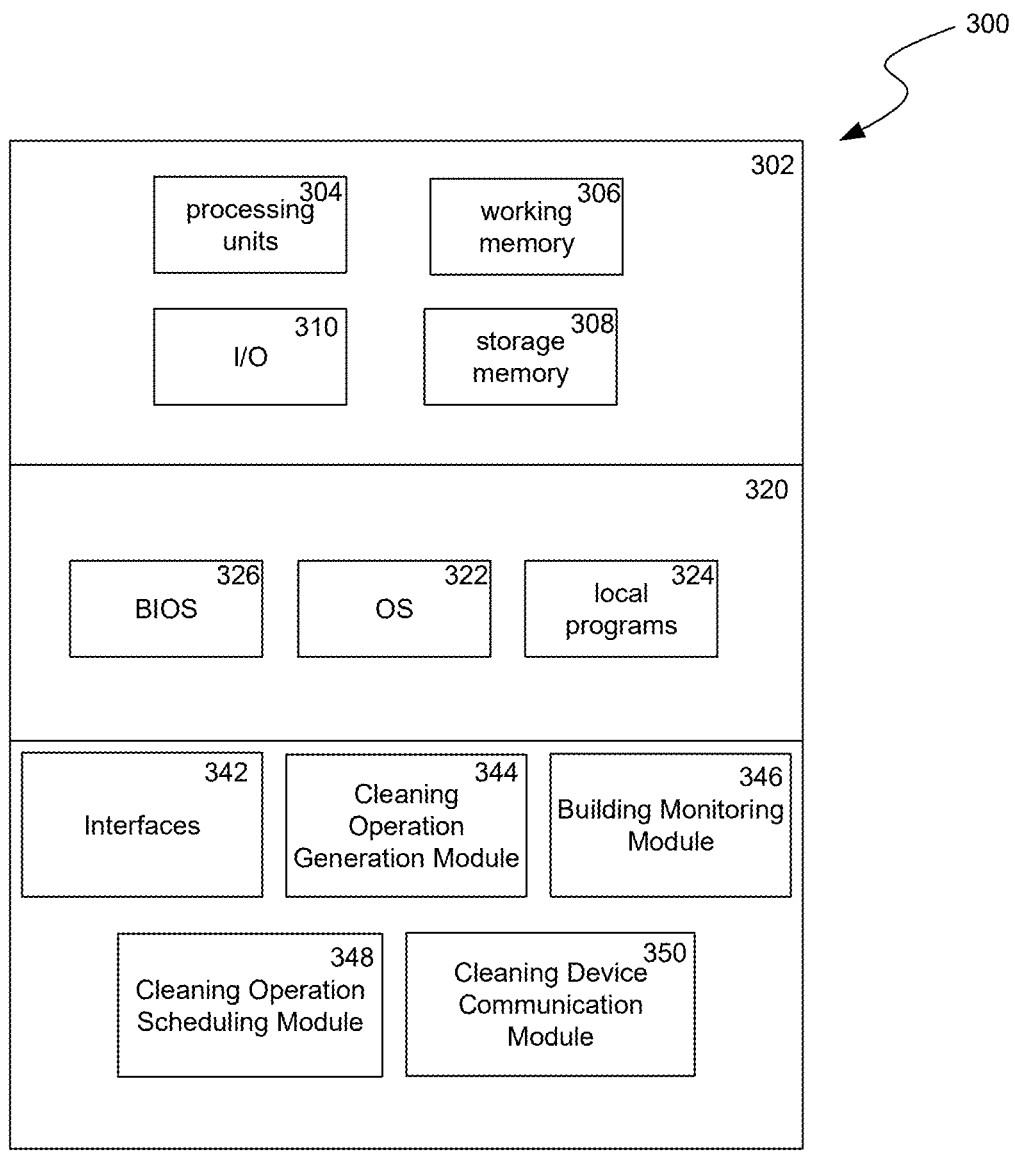
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g., CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g., a redundant array of independent disks (RAID)) accessible through a system bus or can be a cloud storage provider or other network storage accessible via one or more communications networks (e.g., a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include one or more cleaning operation generation modules 344, building monitoring modules 346, cleaning operation scheduling modules 348, cleaning device communication modules 350, machine learning module(s), and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Cleaning operation generation module 344 receives data from one or more building sensors (managed by the building monitoring module 346 as described below) and generates cleaning operations based on the received data. Cleaning operations define an area of a building to be cleaned, a manner or method in which the area of the building is to be cleaned, and a trigger event that triggers the execution of the cleaning operation by one or more cleaning devices in the building. The cleaning operation generation module 344 can also specify which cleaning devices should execute cleaning operations, a scheduled time for cleaning operations, and other details regarding the cleaning operations. After cleaning operations are generated, cleaning operation generation module 344 stores the cleaning operations in memory for later retrieval and execution. Additional details regarding the generation of cleaning operations can be found below in relation to blocks 504-510 of FIG. 5 and block 702 of FIG. 7.

Building monitoring module 346 monitors various portions of the building using one or more sensors, such as cameras, occupancy sensors, lidar sensors, light sensors, door hinge sensors, and other sensors. Using data received from the one more sensors, building monitoring module 346 can determine occupancy statistics within portions of the building, flow of occupants within the portions of the building, and other occupancy data related to the portions of the building. This occupancy data is then provided to the cleaning operation generation module 344 to determine which areas of the building need to be cleaned and associated cleaning operations for handling the areas to be cleaned. The building monitoring module 346 can also use sensor data to detect trigger events associated with cleaning operations stored in memory by the cleaning operation generation module 344. Additional details regarding the monitoring of the building can be found below in relation to block 502 of FIG. 5, block 602 of FIG. 6, and blocks 702-706 of FIG. 7.

Cleaning operation scheduling module 348 schedules cleaning operations stored in memory by the cleaning operation generation module 344. Some cleaning operations do not have trigger events that rely on particular events occurring in the building. Instead, the cleaning operations are scheduled for execution on a particular schedule, such as being executed daily, weekly, monthly, and the like, at particular times of day. The cleaning operation scheduling module 348 can use schedules associated with the portion of the building to schedule the cleaning operations, such as meeting schedules for conference rooms, personal schedules of occupants associated with the portion of the building, and other schedules, such as special event schedules and the like. Additional details regarding the scheduling of cleaning operations can be found below in relation to FIG. 6.

Cleaning device communication module 350 communicates with cleaning devices, such as stationary cleaning devices (e.g., stationary ultraviolet lights, stationary chemical dispensers, and the like) or mobile cleaning devices (e.g., a drone or other mobile robot). The cleaning device communication module 350 generates commands for the cleaning devices, which instruct the cleaning devices to carry out one or more cleaning operations generated by the cleaning operation generation module 344. The cleaning device communication module 350 can also receive messages, instructions, and data from cleaning devices and provide the messages to users associated with building sanitation, such as maintenance workers, sanitation workers, housekeeping staff, and the like. The messages can include confirmation messages of cleaning operations being performed, error messages associated with failed cleaning operations, and the like. Additional details regarding communication with cleaning devices can be found below in relation to FIG. 8.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
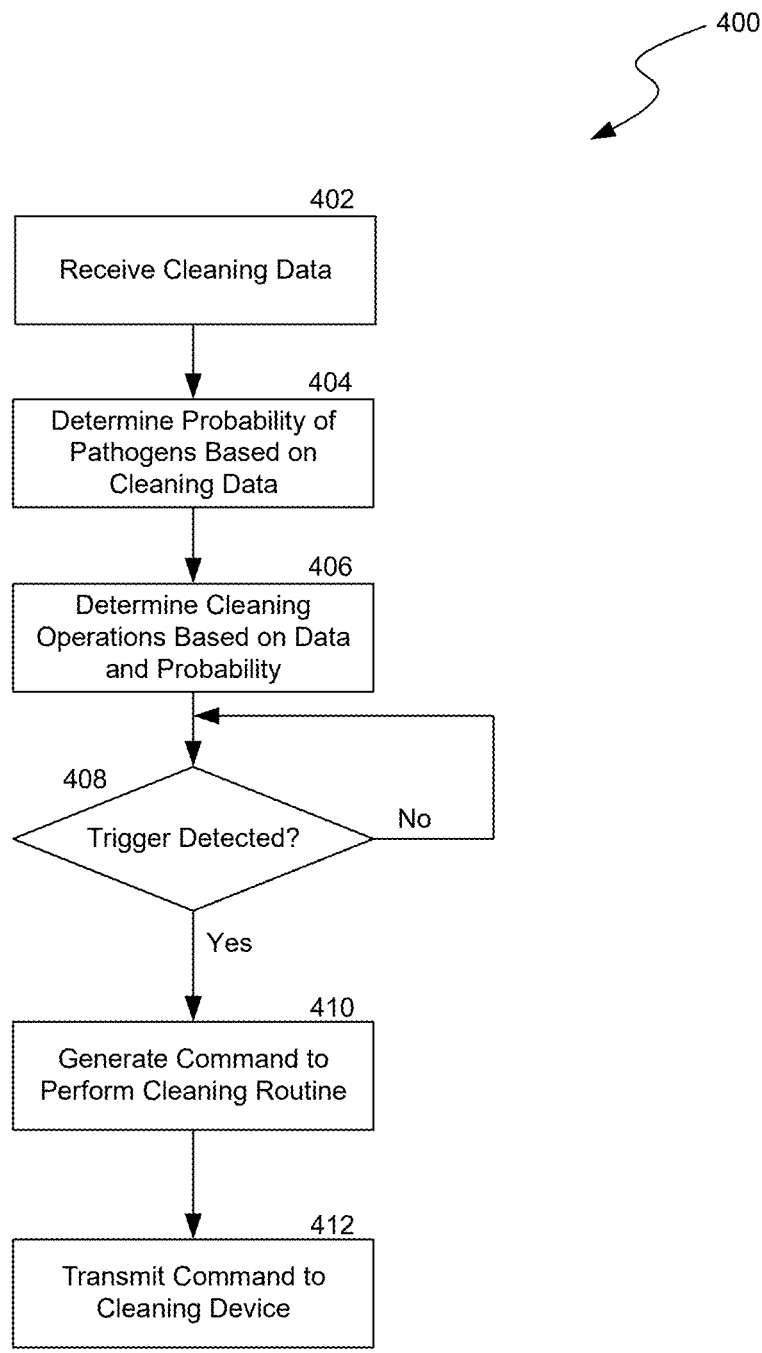
FIG. 4 is a flow diagram illustrating a process used in some implementations for automatically performing a cleaning operation.

FIG. 4 is a flow diagram illustrating a process 400 used in some implementations for automatically performing a cleaning operation. In one example, process 400 can be executed in response to a user input for generation of cleaning operations, such as a user selecting an option on a building management user interface to generate cleaning operations for a portion of a building. In another example, process 400 can be executed periodically, such as being executed hourly, daily, weekly, and the like.

At block 402, process 400 receives cleaning data from one or more data sources. The cleaning data can be data associated with potential presence of one or more pathogens, other biological substance, chemical, food, compound, etc. in the portion of the building. The one or more data sources can include one or more sensors, one or more cameras, one or more smart devices, one or more Internet of Things devices, one or more mobile devices, one or more publicly available databases, and the like. Additional details regarding receiving data from data sources can be found below in relation to block 502 of FIG. 5.

At block 404, process 400 determines a probability of one or more pathogens being present in the portion of the building or in an area of the portion of building based on the received cleaning data. For example, using a combination of publicly available health data and a number of people entering and exiting the portion of the building, the automatic building sanitation system can determine a probability that a particular pathogen is present in the portion of the building. In another example, if a known occupant of the building reports an illness, the automatic building sanitation system can determine what areas of the portion of the building that occupant was present in, and using a date and time of illness, determine the risk of pathogens being present in the portion of the building.

At block 406, process 400 determines one or more cleaning operations to perform based on the cleaning data, the determined probability of one or more pathogens being present, and/or one or more risk tolerance conditions. A cleaning operation defines which area of the portion of the building should be cleaned, the manner in which the area should be cleaned, and a trigger event for the cleaning operation. The defined area can be a specific item or location, such as a door handle, faucet, or countertop, a shared desk, a keyboard, a mouse, a printer, a docking station for a computer, a vending machine or other dispensing machine, an elevator, objects within an elevator (such as a panel of buttons or railings), fitness equipment or gym areas, seats in an auditorium or theater, concession stands, or a bounded area within the portion of the building, such as a room, a portion of a room, and the like. The manner in which the area should be cleaned can include the use of stationary cleaning systems such as stationary UV lights or disinfecting systems or the use of mobile cleaning systems, such as a drone with UV lights or disinfecting systems. The manner in which the area should be cleaned can also include a type of disinfectant or other chemical to be used, when the disinfecting should be performed, if disinfecting is safe to perform while people are in the vicinity of the area, and the like. Additional details regarding defining an area to be cleaned can be found below in relation to block 504 of FIG. 5.

The trigger event for the cleaning operation is an event that occurs that prompts the automatic building sanitation system to initiate the cleaning operation. In some implementations, the trigger event is a scheduled time for a cleaning operation occurring. For example, certain cleaning operations can be performed daily or weekly. In some cases, the trigger events can include gating conditions, such as to only delay performing certain cleaning operations until it's determined that humans are not present. Therefore, one or more schedules associated with the building, such as schedules associated with occupants of the building, can be accessed to determine when to schedule cleaning operations. Additional details regarding trigger events being scheduled can be found below in relation to FIG. 6.

In other implementations, the trigger event can be an event that is detected by the automatic building sanitation system. For example, one or more sensors can detect an occupancy above a threshold occupancy in a particular area. After the area has emptied, the automatic building sanitation system can initiate a cleaning operation for the area. In another example, the automatic building sanitation system can access publicly available health data and, in response to certain thresholds being met by the data, automatically initiate a cleaning operation for an area of the building. Additional details regarding trigger events being detected can be found below in relation to FIG. 7.

In some implementations, the risk tolerance conditions are used to help determine a particular cleaning operation. Risk tolerance conditions can be set based on policies of the building, such as particular rules put in place by the building in response to various situations. For example, the risk tolerance condition can help to define a frequency of cleaning operations, locations of cleaning operations, and other parameters of the cleaning operations based on various rules/policies of the building and/or other data points.

At block 408, process 400 waits for detection of a trigger event associated with a cleaning operation. As described above in relation to block 406, the trigger event can be a scheduled time for execution of the cleaning operation or a detection of a particular event via one or more methods. If a trigger event associated with a cleaning operation is not detected ("No" at decision block 408), process 400 returns to waiting for detection of a trigger event. In some implementations, process 400 can poll a memory location to detect one or more event trigger flags or indications and, in response to detection of the event trigger flag or indication, proceeding with the process 400.

If a trigger event associated with a cleaning operation is detected ("Yes" at decision block 408), process 400, at block 410, generates a command to execute the cleaning operation. The command can indicate to a cleaning device, such as a stationary cleaning device or a mobile cleaning device, an area of a portion of a building to clean and a manner in which the area is to be cleaned. The command can also indicate other information for the cleaning device, such as an amount of cleaning materials to be used, an amount of UV light to be used, particular methods for cleaning objects in the area to be cleaned, particular obstacles to cleaning the area, and other details regarding the cleaning operations. At block 412, process 400 transmits the generated command to the cleaning device, which then executes the cleaning operation detailed in the generated command. Additional details regarding the execution of cleaning operations by the cleaning device can be found below in relation to FIG. 8.

Figure 5:
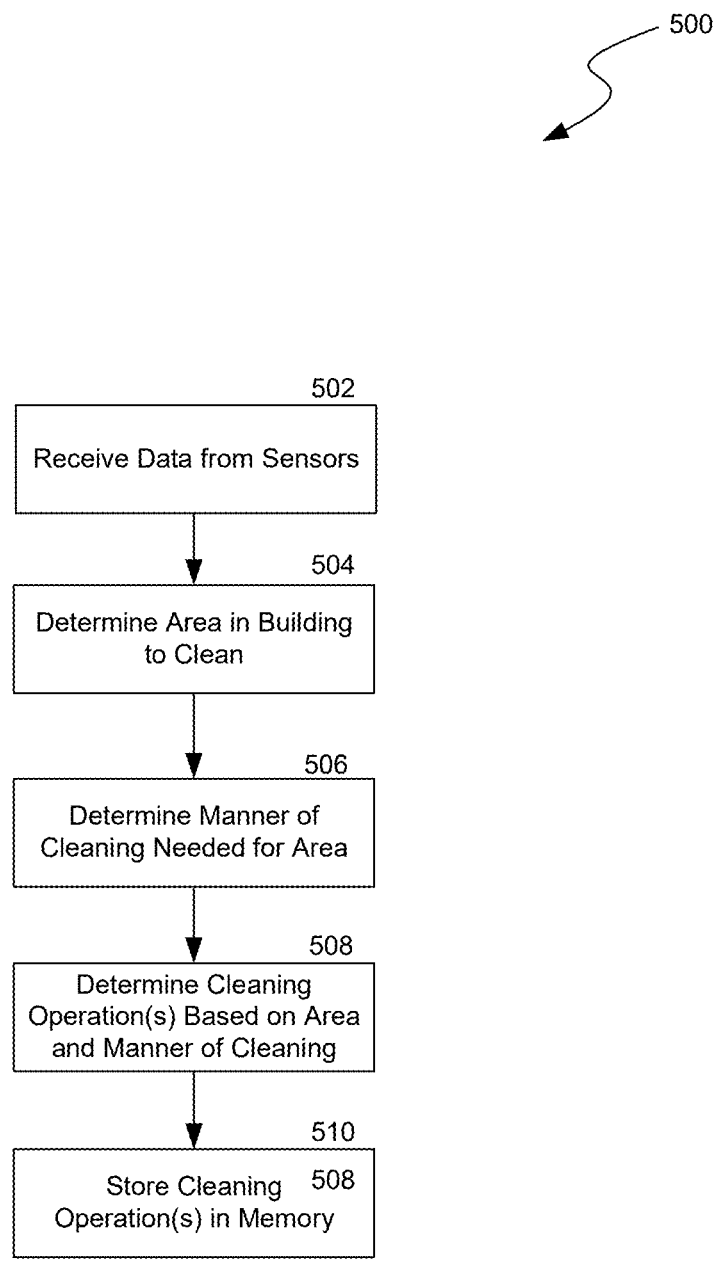
FIG. 5 is a flow diagram illustrating a process used in some implementations for automatically generating cleaning operations.

FIG. 5 is a flow diagram illustrating a process 500 used in some implementations for automatically generating a cleaning operation. In some implementations, process 500 is executed in response to a user input to create one or more new cleaning operations. In other implementations, process 500 is executed in response to one or more generation triggers. For example, process 500 can be executed in response to a daily schedule indicating that new cleaning operations should be generated.

At block 502, process 500 receives cleaning data from one or more data sources. In one example, the received cleaning data can include data from one or more sensors, such as motion detection sensors, tactile sensors, pressure sensors, chemical sensors, gas sensors, humidity/moisture sensors, door hinge sensors, thermal sensors, lidar sensors, and the like. In another example, cleaning data can be received from one or more cameras or one or more smart devices or Internet of Things devices. For example, cameras can track movements of persons through the portion of the building and smart devices/Internet of thing devices can determine when the device is used, an identity of a user, and the like. In another example, persons can be tracked using mobile devices, such as smartphones, that belong to each person. These mobile devices can be tracked by: determining when mobile devices associated with each person are connected to a particular wireless network or a particular wireless network router, determining if the mobile device makes communicative contact with another computing device (such as a smart device or Internet of Things device), analyzing a location signal provided by the mobile device to a central data source, and the like.

Data from these sensors can be used to determine occupancy and/or usage of the portion of the building. Occupancy and usage data can indicate which persons have been in the portion of the building, how long the persons were in the portion of the building, what particular areas or items the persons occupied or utilized while in the portion of the building, and the like. The occupancy and usage data can then be included as part of the cleaning data received by the automatic building sanitation system.

Other data sources can include historical usage and occupancy data of the portion of the building stored in a memory associated with the portion of the building and publicly available health data. For example, the cleaning data can include historical usage data, such as average number of persons that use the portion of the building per day, and can also include publicly available data, such as public infection rates, Center for Disease Control data regarding a particular illness, Health and Human Services data regarding a particular illness, gross number of cases of a particular illness, and the like.

User input data can also be a data source for cleaning data. For example, users can use software applications or hardwired logic on mobile devices to enter health information, such as entering information related to an illness the user has experienced (symptoms, diagnosis, length of illness, side effects, and the like). The automatic building sanitation system can receive this data and determine, using data from one or more sensors, cameras, or devices, to determine areas of the portion of the building the user has occupied within a particular amount of time before and after the illness first affected the user.

Each of these data sources can be used to help determine a probability of one or more pathogens being present in the portion of the building as described above in relation to block 404 of FIG. 4. In some implementations, various data sources and various data elements can be given different weights. For example, in buildings where particular areas have extremely high usage and occupancy, such as cafeterias, data sources indicating high usage and occupancy areas can be given a larger weight in determining if a pathogen is present in a portion of the building. In another example, if an outbreak of a particular pathogen is being experienced in a geographical vicinity associated with the building, public health data can be given more weight in determining if a pathogen is present in a portion of the building.

Other details regarding particular pathogens can be used to determine if the pathogen is potentially present in a portion of the building. For example, pathogen survival rates on surfaces, infection rates of the pathogen in particular populations that may be using the portion of the building, and other data about the pathogen can be used to determine if the pathogen is present in the portion of the building.

At block 504, process 500 determines an area in the portion of the building to clean. In some implementations, the area of the portion of the building can be determined based on the probability of the one or pathogens being present in the portion of the building and other cleaning data gathered in block 502. For example, the area of the portion of the building to be cleaned can be a particular surface, such as a countertop, door handle, floor, handrail, appliance, furniture, drink dispenser, register, payment device, podium, microphone, and the like. In another example, the area of the portion of the building to be cleaned can include all objects and/or surfaces in a particular room or portion of a room, such as a restroom, a personal office, a cafeteria or portion of a cafeteria, a hallway, a public lobby, and the like. In some implementations, the area can be defined using virtual boundaries, such as defining coordinates and boundaries in a virtual coordinate system used by mobile cleaning devices. The virtual boundaries can be defined by a user via a user interface on a computing device or can be preset virtual boundaries set by the automatic building sanitation system. In other implementations, physical boundaries for the area to be cleaned can be defined, such as using magnetic strips or chemical deposits to define a boundary for a mobile cleaning device or placing stationary cleaning devices in areas to be cleaned.

At block 506, process 500 determines one or more manners or methods in which the determined area should be cleaned. The manners or methods of cleaning can be determined based on the area to be cleaned, the cleaning data, what potential pathogens may be present in the area to be cleaned, what cleaning devices are available to clean the area, and other information. For example, if an area cannot be cleaned by a stationary cleaning device, a mobile cleaning device must be used, such as a drone with an attached cleaning system, such as a disinfect dispersal system. In another example, the if a particular pathogen is present or potentially present in the in the area to be cleaned, a particular disinfecting technique or product must be used. In yet another example, particular methods of cleaning, such as using ozone or UV light or a particular chemical, can be determined based on public health data, if occupants of the building will be present within a particular time range, one or more schedules of the occupants of the building, one or more events associated with the building, and the like.

At block 508, process 500 determines one or more cleaning operations based on the cleaning data, the area to be cleaned, and the method or manner in which the area is to be cleaned. As described above in relation to block 406 of FIG. 4, cleaning operations include the area to be cleaned, the method or manner in which the area is to be cleaned, and one or more trigger events that cause the cleaning operation to be performed. In some implementations, the trigger event is a scheduled time at which the cleaning operation should be performed. In other implementations, a particular event, such as a new person entering the building, can be a trigger event for a cleaning operation. Additional details regarding scheduled times as trigger events for cleaning operations can be found below in relation to FIG. 6, and additional details regarding particular events being trigger events for cleaning operations can be found below in relation to FIG. 7.

At block 510, process 500 stores the determined cleaning operations in memory for later access. In some implementations, in addition to storing the cleaning operations in memory, process 500 can also begin to monitor various data sources for trigger events associated with the stored cleaning operations. For example, process 500 can access and monitor a virtual calendar to determine when specific cleaning operations are scheduled. In another example, process 500 can receive data from one or more sensors, public health data sources, and the like to detect trigger events, such as a gross number of infections crossing a threshold value, associated with specific cleaning operations. If the trigger events are detected, one or more cleaning operations can be accessed in memory and commands to execute the cleaning operations can be generated, such as commands described above in relation to block 410 of FIG. 4.

Figure 6:
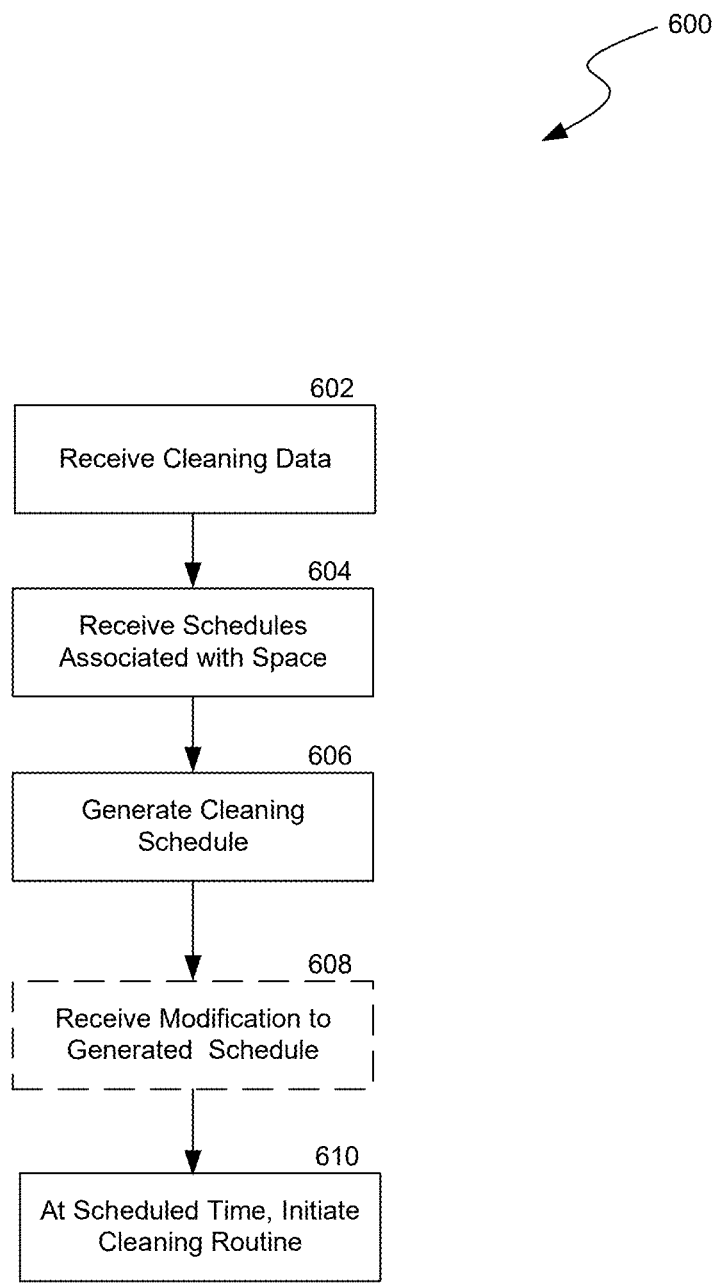
FIG. 6 is a flow diagram illustrating a process used in some implementations for automatically scheduling cleaning operations.

FIG. 6 is a is a flow diagram illustrating a process 600 used in some implementations for automatically scheduling cleaning operations. In some implementations, process 600 is performed in response to one or more cleaning operations being determined, such as at block 508 of FIG. 5. In other implementations, process 600 is performed at regular intervals, such as regularly scheduling one or more cleaning operations stored in a memory associated with the automatic building sanitation system.

At block 602, process 600 receives cleaning data. The cleaning data can be used to help generate the schedule for cleaning operations. Much like the cleaning data received at block 502 of FIG. 5, the cleaning data can include public health data, occupancy data of one or more portions of the building, and other data that can be used to determine what cleaning operations should be scheduled and when the cleaning operations should be scheduled. In particular, the cleaning data can be building occupancy and usage data. Using this data, process 600 can determine what areas of the building have high usage or occupancy.

At block 604, process 600 receives one or more schedules associated with the portion of the building to be cleaned. In some implementations, the schedules are associated with building occupants. The building occupants can create events or meetings on virtual schedules or calendars and can associate these events or meetings with particular portions of the building, such as a conference room, public area, gym, bathroom, computer room, warehouse, kitchen, auditorium, hallway, garage, parking lot, lobby, an individual office, a private living space, and the like. These events or meetings can be created as data objects, which process 600 then can analyze to determine when particular portions of the building will be in use, how many people will be in portions of buildings, and the like. In other implementations, process 600 can synthesize a schedule of one or more occupants to form an overall schedule of the portion of the building or receive an overall schedule from a central scheduling service for the portion of the building.

At block 606, process 600 generates a cleaning schedule for the portion of the building. Based on the received schedules and the cleaning data, the process 600 can generate a schedule for cleaning operations to be performed on the portion of the building or objects or particular areas within the portion of the building. In some implementations, the cleaning schedule can be updated at regular intervals or can be generated to be repeatable. For example, based on the received schedules and the cleaning data, process 600 can create a cleaning schedule specifying when particular cleaning operations should be performed on a daily basis, a weekly basis, a monthly basis, and the like, and then can generate updates or modifications to the schedule based on additional data. In another example, process 600 can generate a new cleaning schedule for a particular period of time, such as generating a new schedule every day based on new cleaning data and one or more updated schedules associated with the portion of the building. Cleaning frequency can also be adjusted due to other considerations, such as a nature of the activity in the building area, rank of the personnel, frequency of visitors (non-workers), movement patterns (e.g., movement patterns of occupants, equipment, etc.), and/or human density in the area.

In some implementations, some cleaning operations can be considered hazardous when performed in the vicinity of humans. For example, spraying chemicals, using UV light, or using particular cleaning products can be harmful if performed in the vicinity of humans, which requires cleaning operations with these actions to be performed at times when humans are not present. The automatic building sanitation system can identify when occupants are in particular areas or when particular areas are most likely to have a high occupancy, and can schedule cleaning operations that could be hazardous to occur when occupancy of a portion of the building is not likely to be high, such as at night or during a shift change.

At block 608, process 600 can optionally receive a modification to the generated cleaning schedule. In some implementations, the generated cleaning schedule can be modified by one or more users that have access to the cleaning schedule, such as cleaning supervisors, building maintenance staff, housekeeping employees, and others. The users can create modifications, such as rescheduling cleaning operations, adding cleaning operations at specified times, removing scheduled cleaning operations from the schedule, and the like. In other implementations, process 600 can make automatic modifications to the schedule based on updated cleaning data, updated schedules associated with the portion of the building, and the like. For example, if an occupant is detected in the area at the time a cleaning operation is scheduled, the schedule can be modified to remove the cleaning operation or delay the cleaning operation until the area is no longer occupied. While any step described in regards to any process described in this patent application can be an optional step in the process, this block is shown in dashed lines to illustrate it as an explicit example of a step in a process that can be omitted.

At block 610, process 600 monitors the generated schedule and, at a scheduled time for a cleaning operation to occur, a command is generated and transmitted to one or more cleaning devices to execute the cleaning operation. Additional details regarding the generation and transmittal of commands to cleaning devices can be found below in relation to FIG. 8.

Figure 7:
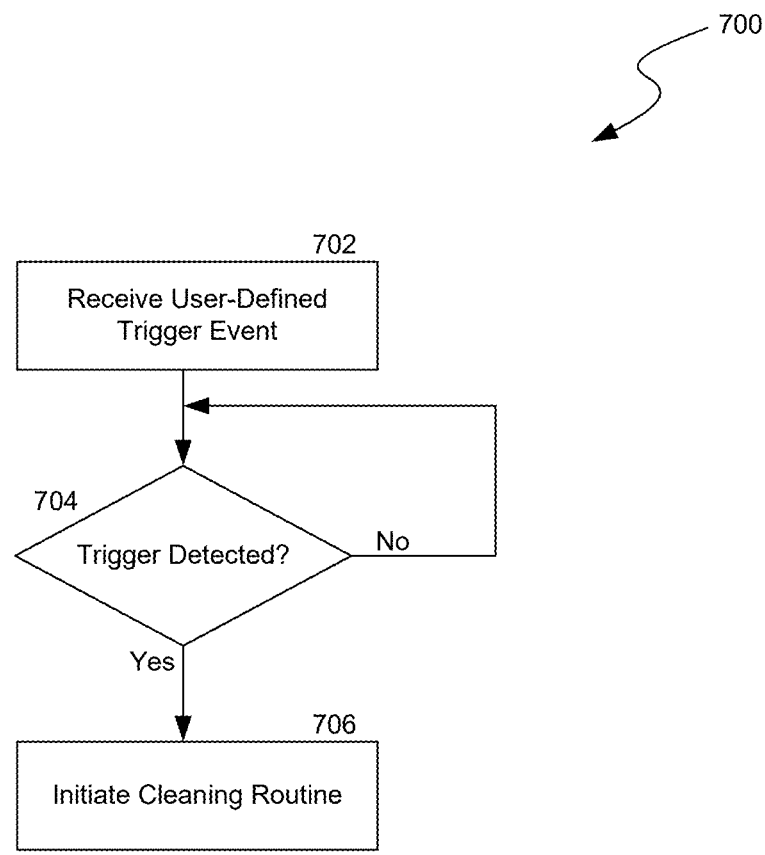
FIG. 7 is a flow diagram illustrating a process used in some implementations for automatically performing cleaning operations in response to a trigger event.

FIG. 7 is a flow diagram illustrating a process 700 used in some implementations for automatically performing a cleaning operation in response to a trigger event. In some implementations, process 700 is performed when a new cleaning operation is determined or defined, such as at block 406 of FIG. 4.

At block 702, process 700 receives a user-defined trigger event for a cleaning operation. The trigger event is an event that is detectable using data, such as public health data or data from one or more sensors associated with the portion of the building to be cleaned. Each cleaning operation can have one or more trigger events associated with the cleaning operation. If one or more of the trigger events occur, or a defined combination of trigger events occurs, commands to execute the cleaning operation can be generated and transmitted to cleaning devices.

In some implementations, the trigger event is a user-defined trigger event. When the cleaning operation is first determined, a user associated with managing cleaning operations can define one or more trigger events and associated thresholds or conditions for the trigger events. For example, a cleaning operation can have a trigger event that includes using a sensor to detect when a person enters a particular room or area of the building. The threshold or condition associated with the trigger event can be a threshold number of people being in the room or area at one time or a threshold number of people entering and exiting the room or area in a defined period of time. In another example, if the number of cases of a particular pathogen reaches a certain number, such as a certain percentage of the population of a geographic area associated with the building or a gross number of cases of infection in the geographic area, the threshold or condition is met, the cleaning operation is executed.

At block 704, process 700 waits for detection of the trigger event of at least one cleaning operation. In some implementations, the automatic building sanitation system runs process 700 "in the background," or in a waiting state, while the trigger event for one or more cleaning operations have not been detected. While the trigger event has not been detected ("No" at block 704), process 700 continues to wait on the detection of a trigger event.

If the trigger event is detected ("Yes" at block 704), process 700 generates a command to initiate the cleaning operation(s) associated with the trigger event (at block 706). The command instructs one or more cleaning devices to execute the cleaning operations associated with the detected trigger event. Process 700 then transmits the command to the cleaning devices for execution of the cleaning operations. Additional details regarding the execution of cleaning operations by cleaning devices in response to received commands can be found below in relation to FIG. 8.

Figure 8:
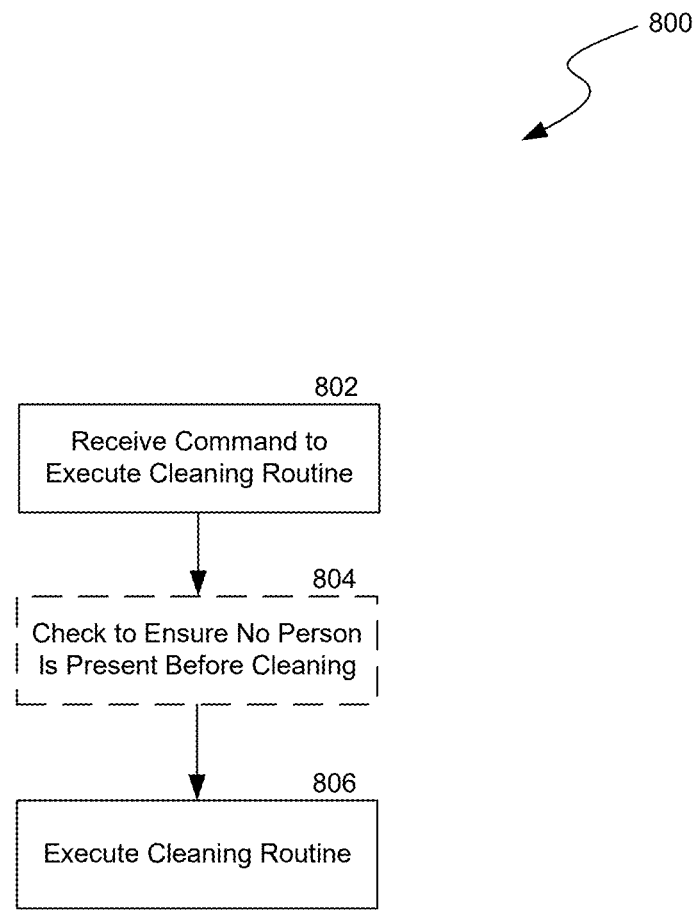
FIG. 8 is a flow diagram illustrating a process used in some implementations for automatically executing cleaning operations with a cleaning device.

FIG. 8 is a flow diagram illustrating a process 800 used in some implementations for automatically executing a cleaning operation with a cleaning device. In some implementations, process 800 is executed in response to a cleaning device receiving a command from the automatic building sanitation system to execute a cleaning operation (e.g., issued at block 412 of FIG. 4).

At block 802, process 800 receive the command generated by the automatic building sanitation system. The command includes an area of a portion of a building to clean, a manner in which the area should be cleaned, and other information, such as potential obstacles that can be located in the area, schedules of occupants of the area to be cleaned, and other information. In some implementations, the command specifies a particular type of cleaning to be performed, such as using UV light or a particular disinfecting chemical in the area, and an amount of cleaning material to be used, such as an intensity or duration of UV light to be used or an amount of chemicals to be used.

At block 804, process 800 uses the one or more cleaning devices to optionally check to ensure that no occupants of the building are present in the area before executing the cleaning operation. In some implementations, the one or more cleaning devices can include on-board sensors, such as cameras, lidar sensors, and the like, to detect if a person is present in the area that is to be cleaned by the one or more cleaning devices. In other implementations, the one or more cleaning devices can receive occupancy information about the area from one or more cameras located in the area, from information regarding mobile computing devices being connected to a network gateway within the area, from received schedules associated with occupants of the area, and the like. Based on this received information, the one or more cleaning devices can determine if the area to be cleaned is currently occupied or while be occupied during the cleaning operation.

In some implementations, the cleaning operation can be delayed while occupants are present in the area, and the one or more cleaning devices can receive data indicating whether or not the occupants have left the area, and only proceed with the cleaning operation after the occupants have vacated the area. In other implementations, the cleaning operation can be rescheduled for a new time when the area will be unoccupied or is less likely to be occupied. In some implementations, instead of automatically rescheduling the cleaning operation, the automatic building sanitation system can be notified by the one or more cleaning devices that the cleaning operation cannot be completed. The automatic building sanitation system can then notify authority figures that the cleaning operation was not completed, and the authority figures can reschedule the cleaning operation or take other actions to ensure the area is sanitized.

While, as noted above, any step in the processes described in this patent application can be optional, this block is shown in dashed lines to illustrates explicit examples where this step is considered optional.

At block 806, process 800 executes the cleaning operation with the one or more cleaning devices. The area is cleaned using the defined manner or method of cleaning, such as an intensity or duration of UV light to be applied to the area or a particular amount of a disinfecting chemical to the area.

In some implementations, the one or more cleaning devices can generate a message indicating successful execution of the cleaning operation or failure of the cleaning operation, which the cleaning device can send back to the automatic building sanitation system. The message can provide information about the execution of the cleaning operation, such as time of execution, duration of execution, potential failures, if obstacles or occupants were encountered or avoided, if the cleaning operation was delayed, cleaning device performance data, errors with the cleaning device(s), and other data of use to persons who oversee building sanitation.

Figure 9:
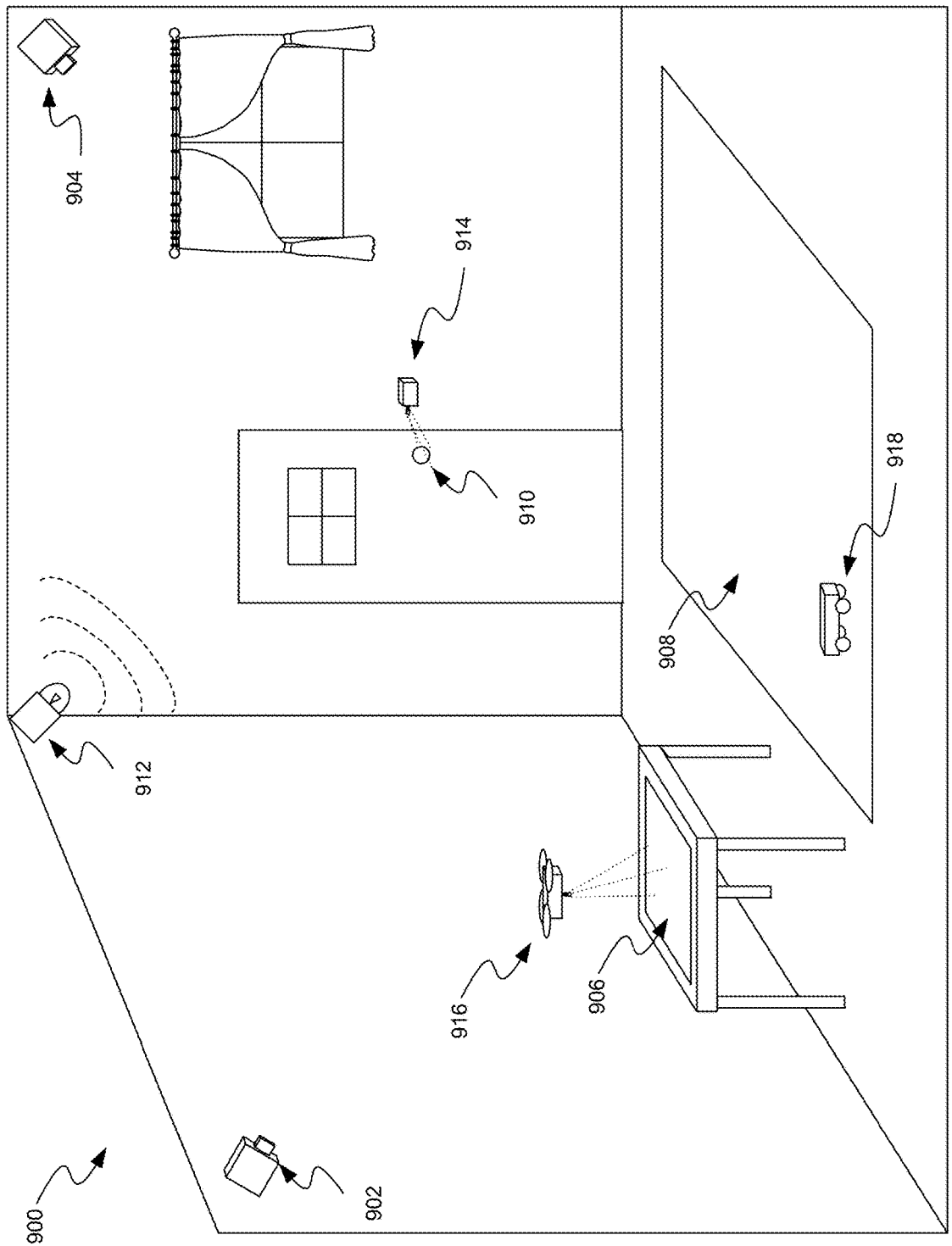
FIG. 9 is a conceptual diagram illustrating cleaning devices performing cleaning operations according to one implementation of the present invention.

FIG. 9 is a conceptual diagram 900 illustrating cleaning devices performing cleaning operations according to one implementation of the present invention. The automatic building sanitation system can receive cleaning data from one or more sensors 902 and 904, represented in FIG. 9 as cameras observing a room in a building. The cameras observe the room to determine if any person occupies one or more spaces in the room or interacts with particular portions of the room, such as spaces 906 and 908 or doorknob 910. The automatic building sanitation system can also receive public health data, such as infection rates of particular pathogens in a geographic area associated with the building.

Based on the received data from the one or more sensors 902 and 904 and the public health data, the automatic building sanitation system can generate one or more cleaning operations for the room, as described above in relation to FIGS. 4 and 5. The cleaning operations can define areas in the room, such as spaces 906 and 908 and doorknob 910, that require cleaning based on data from the one or more sensors 902 and 904 and the public health data. For example, if infection rates for a particular pathogen in the geographic area of the building are above a particular threshold, the automatic building sanitation system can generate one or more cleaning operations to disinfect the room. The one or more cleaning operations can include a trigger event for the cleaning operations. For example, if a person interacts with the spaces 906 and 908 or the doorknob 910, as indicated by the one or more sensors 902 and 904, the automatic building sanitation system can initiate cleaning operations associated with the spaces 906 and 908, the doorknob 910, or the room in general.

The automatic building sanitation system generates commands to execute the cleaning operations and then transmits the command to one or more cleaning devices. As described above in relation to FIG. 8, cleaning devices can be devices such as stationary ozone or UV light fixtures, such as light fixture 912, stationary disinfectant dispenser 914, a flying drone 916 for dispensing ozone or UV light or disinfecting chemicals, or a mobile drone 918 for dispensing disinfecting chemicals or performing other cleaning tasks. The cleaning devices then execute the cleaning operations as specified in the received commands. For example, light fixture 912 can provide ozone light or UV light to the room as a whole to disinfect surfaces in the room, stationary disinfectant dispenser 914 can dispense chemicals to disinfect the doorknob 910, and flying drone 916 and mobile drone 918 can performing cleaning operations in the room, such as in spaces 906 and 908.

The systems disclosed herein can include one or more machine learning (ML) models or modules configured to analyze data to determine one or more pathogen probabilities (e.g., probability of pathogen(s) being present at a location or a building), cleaning operations, schedules, or the like. The ML modules can be trained using one or data sets selected based on one or more similarities, such as geographic location, building characteristics (e.g., airflow, occupant density, internal equipment, etc.), cleaning data, etc. ML algorithms (and models) may be stored locally at databases and/or externally at databases (e.g., cloud databases and/or cloud servers). For example, an automatic building sanitation system can use one or more ML models to generate cleaning plans, which are used to generate commands for cleaning operations. In some embodiments, operation generation modules (e.g., operation generation module 344), building monitoring modules (e.g., building monitoring module 346), operation scheduling modules (e.g., operation scheduling module 348), and other modules disclosed herein can include one or more ML models, ML algorithms, and/or ML models.

A ML module may refer to a predictive or statistical utility or program that may be used to determine a probability distribution over one or more character sequences, classes, objects, result sets or events, and/or to predict a response value from one or more predictors. A ML model may be based on, or incorporate, one or more rule sets, machine learning algorithms, a neural network, or the like. In examples, the ML models may be located on the client device, service device, a network appliance (e.g., a firewall, a router, etc.), or some combination thereof. ML models can be of various types, such as Convolutional Neural Networks (CNNs), other types of neural networks (e.g. fully connected), decision trees, forests of classification trees, Support Vector Machines, etc.

A training procedure can include obtaining suitable training items from data sets with input associated with a result, applying each training item to the model, and updating model parameters based on comparison of model result to training item result. In some embodiments, training set(s) can be selected, generated, and/or organized by identifying one or more similarities and/or matches with available data for the location, building, and/or area interest. In some embodiments, the ML models may process defined area data, historical data, reference data, building data, cleaning data, occupant data (e.g., medical data associated with individual occupants), and other data. In one implementation, the defined area for training can be a specific item or location as discussed above. Training data sets with the same specific item or location can then be selected to train the ML module.

Based on an aggregation of selected data, at least one ML model may be trained and subsequently deployed to automatically determine, for example, one or more triggers for initiating cleaning, a probability of one or more pathogens being present in a portion of a building, etc. Training reference sets can be selected based on the available data type. For example, image training sets, sensor data training sets, and location data training sets can be used to train ML modules that receive data from cameras, sensors, and devices, respectively. In some implementations, reference image sets can be selected to train a ML module when an available data source is a camera. The ML modules for determining cleaning operations can be trained using, for example, one or more training reference sets for available cleaning devices such that training sets match available resources. Training references sets can include, without limitation, functionality of available cleaning devices, limiting factors for cleaning operations, cleaning device data, and/or other data disclosed herein. In some implementations, ML modules can be trained using human activity data sets or infection rate data sets to determine human activity for one or more pathogens or one or more current infection rates for one or more pathogens, respectively.

The trained ML model may be deployed to one or more devices. As a specific example, an instance of a trained ML model may be deployed to a server device and to a client device. The client device can be located at a building at which cleaning operations are to be performed. The ML model deployed to a server device may be configured to be used by the client device when, for example, the client device is connected to the internet. For example, a client device at a building or cleaning service can periodically communicate with the server device. Conversely, the ML model deployed to a client device may be configured to be used by the client device when, for example, the client device is not connected to the internet. This allows cleaning data to be generated independent of an internet connection.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for automatically performing a cleaning operation for a portion of a building, the method comprising:
   receiving cleaning data from one or more data sources, the cleaning data specifying human activity in the portion of the building and/or one or more current infection rates for one or more pathogens;
   determining, based on the cleaning data, a probability of the one or more pathogens being present in the portion of the building;
   determining one or more cleaning operations for the portion of the building based on the received cleaning data, the determined probability, a risk tolerance condition, and a trigger for initiating the clearing operation, wherein each cleaning operation of the one or more cleaning operations indicates an area within the portion of the building to be cleaned, and a manner in which the area is to be cleaned,
      wherein the trigger is a user device connecting to a network gateway within the building for internet communication; and
   in response to detecting the trigger for at least one cleaning operation of the one or more cleaning operations:
      generating a command for at least one mobile robotic cleaning device to deploy to the area within the portion of the building to perform the at least one cleaning operation; and
      transmitting the command to the at least one mobile robotic cleaning device.

2. The method of claim 1, wherein the one or more data sources includes at least one of: a camera, a sensor, publicly available health data, user-defined health data, user device location data, or any combination thereof.

3. The method of claim 1, wherein determining the one or more cleaning operations for the portion of the building further includes:
   identifying one or more available cleaning devices for cleaning the portion of the building;
   identifying functionality of one of the one or more available cleaning devices;
   selecting a cleaning device of the one or more available cleaning devices based on the identified functionality; and
   determining the one or more cleaning operations based on the selected cleaning device.

4. The method of claim 1,
   wherein the trigger for each cleaning operation of the one or more cleaning operations is determined by:
      determining a schedule for cleaning the portion of the building; and
      assigning a scheduled time to each cleaning operation of the one or more cleaning operations based on the determined schedule; and
   wherein detecting the trigger for the at least one cleaning operation includes identifying a cleaning operation of the one or more cleaning operations scheduled to be performed at the scheduled time.

5. The method of claim 1,
   wherein the trigger for each cleaning operation of the one or more cleaning operations is a triggering event associated with each cleaning operation; and wherein detecting the trigger of the at least one cleaning operation includes receiving an indication that the triggering event associated with the at least one cleaning operation of the one or more cleaning operations has occurred.

6. The method of claim 5, wherein the indication that the triggering event associated with the at least one cleaning operation is received from a sensor, the user device, or a public health care database.

7. The method of claim 1, wherein the command to perform the at least one cleaning operation specifies, to the at least one mobile robotic cleaning device, the portion of the building to clean and one or more features of the at least one mobile robotic cleaning device to be used in the cleaning.

8. A non-transitory computer-readable medium storing a set of instructions that, when executed by one or more processors, cause the one or more processors to perform a process for automatically performing a cleaning operation for a portion of a building, the process comprising:

receiving cleaning data from one or more data sources, the cleaning data specifying human activity in the portion of the building and/or one or more current infection rates for one or more pathogens;

determining, based on the cleaning data, a probability of the one or more pathogens being present in the portion of the building;

determining one or more cleaning operations for the portion of the building based on the received cleaning data, the determined probability, a risk tolerance condition, and a trigger for initiating the cleaning operation, wherein each cleaning operation of the one or more cleaning operations indicates an area within the portion of the building to be cleaned, and a manner in which the area is to be cleaned, wherein the trigger is a user device connecting to a network gateway within the building for internet communication; and in response to detecting the trigger for at least one cleaning operation of the one or more cleaning operations:

generating a command for at least one mobile robotic cleaning device to deploy to the area within the portion of the building to perform the at least one cleaning operation; and transmitting the command to the at least one mobile robotic cleaning device.

9. The non-transitory computer-readable medium of claim 8, wherein the cleaning data specifies human activity in the portion of the building and/or one or more current infection rates for the one or more pathogens; and wherein the one or more data sources includes at least one of: a camera, a sensor, publicly available health data, user-defined health data, user device location data, or any combination thereof.

10. The non-transitory computer-readable medium of claim 8, wherein determining the one or more cleaning operations for the portion of the building further includes:

identifying one or more available cleaning devices for cleaning the portion of the building;

identifying functionality of one of the one or more available cleaning devices;

selecting a cleaning device of the one or more available cleaning devices based on the identified functionality; and determining the one or more cleaning operations based on the selected cleaning device.

11. The non-transitory computer-readable medium of claim 8, wherein the trigger for each cleaning operation of the one or more cleaning operations is determined by:

determining a schedule for cleaning the portion of the building; and assigning a scheduled time to each cleaning operation of the one or more cleaning operations based on the determined schedule; and wherein detecting the trigger for the at least one cleaning operation includes identifying a cleaning operation of the one or more cleaning operations scheduled to be performed at the scheduled time.

12. The non-transitory computer-readable medium of claim 8, wherein the trigger for each cleaning operation of the one or more cleaning operations is a triggering event associated with each cleaning operation; and wherein detecting the trigger of the at least one cleaning operation includes receiving an indication that the triggering event associated with the at least one cleaning operation of the one or more cleaning operations has occurred.

13. The non-transitory computer-readable medium of claim 12, wherein the indication that the triggering event associated with the at least one cleaning operation is received from a sensor at the building.

14. The non-transitory computer-readable medium of claim 8, wherein the command to perform the at least one cleaning operation specifies, to the at least one mobile robotic cleaning device, the portion of the building to clean and one or more features of the at least one mobile robotic cleaning device to be used in the cleaning.

15. A computing system for automatically performing a cleaning operation for a portion of a building, the computing system comprising:

one or more processors; and one or more memories storing instructions that, when executed by the one or more processors, cause the computing system to perform a process comprising:

receiving cleaning data from one or more data sources, the cleaning data specifying human activity in the portion of the building and/or one or more current infection rates for one or more pathogens;

determining, based on the cleaning data, a probability of the one or more pathogens being present in the portion of the building;

determining one or more cleaning operations for the portion of the building based on the received cleaning data, the determined probability, a risk tolerance condition, and a trigger for initiating the cleaning operation, wherein each cleaning operation of the one or more cleaning operations indicates an area within the portion of the building to be cleaned, and a manner in which the area is to be cleaned, wherein the trigger is a user device connecting to a network gateway within the building for internet communication; and in response to detecting the trigger for at least one cleaning operation of the one or more cleaning operations:

generating a command for at least one mobile robotic cleaning device to deploy to the area within the portion of the building to perform the at least one cleaning operation; and transmitting the command to the at least one mobile robotic cleaning device.

16. The computing system of claim 15, wherein determining the one or more cleaning operations for the portion of the building includes:

identifying one or more available cleaning devices for cleaning the portion of the building;

identifying functionality of one of the one or more available cleaning devices;

selecting a cleaning device of the one or more available cleaning devices based on the identified functionality; and determining the one or more cleaning operations based on the selected cleaning device.

17. The computing system of claim 15, wherein the trigger for each cleaning operation of the one or more cleaning operations is determined by:

determining a schedule for cleaning the portion of the building; and assigning a scheduled time to each cleaning operation of the one or more cleaning operations based on the determined schedule; and wherein detecting the trigger for the at least one cleaning operation includes identifying a cleaning operation of the one or more cleaning operations scheduled to be performed at the scheduled time.

18. The computing system of claim 15, wherein the trigger for each cleaning operation of the one or more cleaning operations is a triggering event associated with each cleaning operation; and wherein detecting the trigger of the at least one cleaning operation includes receiving an indication that the triggering event associated with the at least one cleaning operation of the one or more cleaning operations has occurred.

19. The computing system of claim 18, wherein the indication that the triggering event associated with the at least one cleaning operation is received from a sensor at the building.

20. The computing system of claim 15, wherein the command to perform the at least one cleaning operation specifies, to the at least one mobile robotic cleaning device, the portion of the building to clean and one or more features of the at least one mobile robotic cleaning device to be used in the cleaning.

* * * * *